United States Patent [19]

Chang et al.

[11] Patent Number: 5,717,505
[45] Date of Patent: Feb. 10, 1998

[54] DUST-FREE SCANNER

[75] Inventors: Tony Chang, Hsin-Chu; Jack Lin, E-Lan, both of Taiwan

[73] Assignee: Avision Inc., Hsin-Chu, Taiwan

[21] Appl. No.: 770,041

[22] Filed: Dec. 19, 1996

[51] Int. Cl.⁶ .................... H04N 1/00; G03G 15/04; G03G 21/00
[52] U.S. Cl. ........................ 358/498; 399/98
[58] Field of Search .................. 399/98; 15/1.51; 358/474–498, 305; 347/133; 355/30

[56] References Cited

U.S. PATENT DOCUMENTS

| | | | |
|---|---|---|---|
| 4,295,734 | 10/1981 | Tsuda et al. | 399/355 |
| 5,001,577 | 3/1991 | Lee | 358/498 |
| 5,130,807 | 7/1992 | Tanabe et al. | 358/296 |
| 5,453,852 | 9/1995 | Morikawa et al. | 358/498 |

FOREIGN PATENT DOCUMENTS 59-33443  2/1984  Japan.

*Primary Examiner*—Arthur T. Grimley
*Assistant Examiner*—Sophia S. Chen
*Attorney, Agent, or Firm*—H. C. Lin

[57] ABSTRACT

A dust-collecting padding is placed at the leading edge of the scan window of a scanner. When this dust-collecting padding is in contact with the document to be scanned, the dust particles on the document are collected by the dust-collecting padding, thus maintaining the cleanliness of the document and the scan window. The focal point of the scanning light, where the document is read, can be adjusted to be located away from the surface of the glass window, and thus any dust particles lying on the glass surface are off focus and do not adversely affect the quality of scanning much.

10 Claims, 2 Drawing Sheets

DUST-FREE SCANNER

INTRODUCTION

This invention relates to a scanner which is free from dust contamination.

Conventional scanners are susceptible to dust contamination. FIG. 1 shows the structure of a conventional contact image sensor. A transfer roller 11 rolls over a glass window 12 to feed a document 10. A light source 13 focuses at the contact point 14 between the roller 11 and the glass window 12. The contact point 14 is where the light is reflected and the document 10 is read. The read information is then transmitted to a sensing system 16.

Such a contact image sensor has a short depth of focus. The design has a shortcoming in that dust particles can gradually accumulate at the window. The accumulated dust particles degrade the quality of scanning. The scanned image produces undesirable spots. Therefore, after a certain period of usage, the scanner should be disassembled to clean the glass window. This is an annoying chore. Especially, recent scanners tend to be small in construction and make it more delicate and difficult to be disassembled.

SUMMARY OF THE INVENTION

An object of this invention is to prolong the cleanliness of the scan window and to preserve the quality of the scanner. Another object of this invention is to install a padding at the leading edge of the reading window to collect the dust particles on the document paper, so that the dust particles are not carried to the surface of the reading window, thus prolonging the cleanliness of the reading window and enhancing the quality of the scanning. Still another object of this invention is to suspend the focus over the reading window, so that dust particles carried by the paper document do not accumulate at the reading glass window and do not adversely affect the quality of the scanned image.

These objects are achieved in this invention by placing a dust-collecting padding at the leading edge of scanning window. When this dust-collecting padding is in contact with the document paper, the dust particles on the paper are collected by the dust-catching padding, thus maintaining the cleanliness of the document and the scan window, as well as the quality of scanning. This invention can also adjust the focus of the scanning light away from the contact point between the transfer roller and the glass window. Instead, the focus, which is cast at the document, is suspended above the contact point between the transfer roller and the window. Thus, even when there are dust particles at the glass window surface, they are off focus and do not adversely affect the quality of scanning.

DETAILED DESCRIPTION OF THE PREFERRED EMBODIMENT

Figure 1:
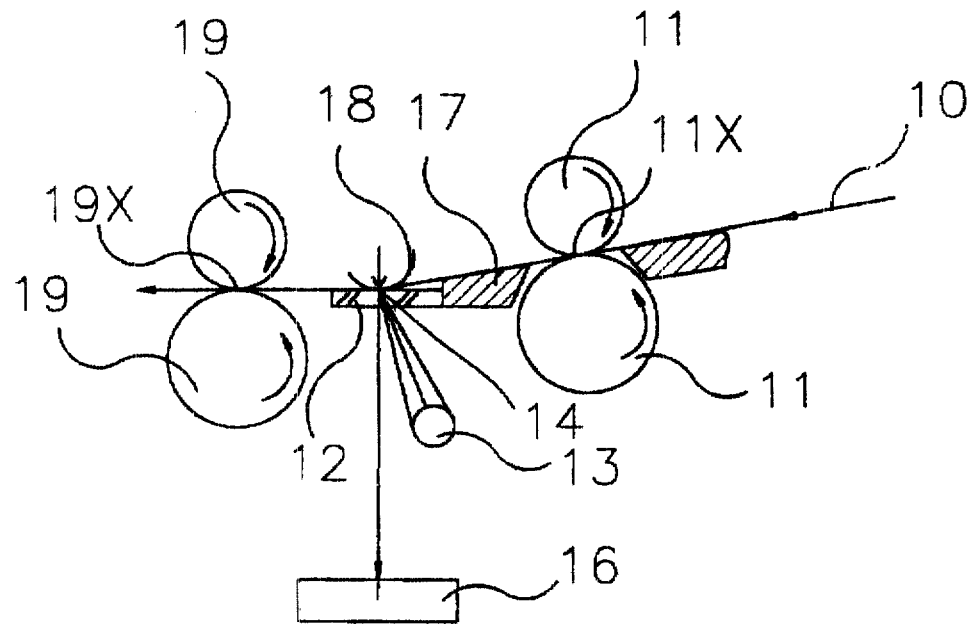
FIG. 1 shows the traditional construction of a scanner.

FIG. 1 shows the construction of a conventional scanner. A transfer roller 11 rolls over a glass window 12 to transfer a document 10 to be scanned. A light source 13 is focused at the contact point 14 between the transfer roller 11 and the glass window 12. This contact point is where the image is read. The reflected light at this focal point is transmitted to an image reading system 16.

Figure 2:
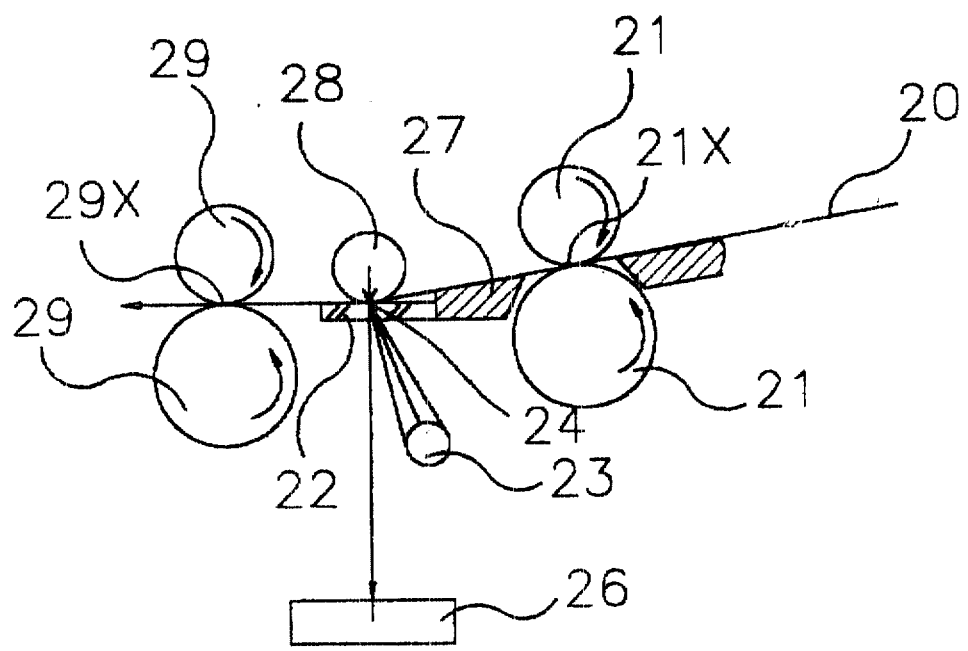
FIG. 2 shows one embodiment of the present invention with a padding placed at the leading edge of the scan window.

FIG. 2 shows one embodiment of the present invention. The basic structure of the scanner is similar to FIG. 1. The feature is that a dust collecting padding 15 is placed at the leading edge of the glass window, where the document 10 begins to be transferred to the glass window. The dust collecting padding 15 catches the dust particles on the document. The dust collecting padding 15 is placed about 12–15 mm away from the contact point 14 between the transfer roller 11 and the glass window 12. Due to static electricity, dust particles tend to accumulate on the surface of the document 10 to be scanned. These particles may stick to the document 10. After scanning, these dust particles cause spots to appear on the reproduced document. This phenomenon may not be a serious problem. The worst situation is that these dust particles may come off from the document and accumulate on the glass window 12. When the accumulated dust particles reach a certain density, they adversely affect of the scanning quality. This kind of contamination causes a great deal of inconvenience to the users. The frequency at which the user must wipe and maintain the cleanliness of the surface of the glass window 12 increases rapidly.

More serious problems happen to certain types of scanners, which are difficult to maintain the cleanliness of the surface of the glass window 12. In particular, for the miniaturized scanners recently appearing in the market, there is very little accessible space in the vicinity of the glass window 12 for cleaning the surface. The dust collecting padding of this invention can overcome this difficulty. The surface of the glass window 12 can be maintained for long periods of cleanliness, thus reducing the frequency of cleaning maintenance.

When the dust collecting padding 15 is in contact with the document 10 to be scanned, the dust particles on the surface of the document 10 come off due to friction and deposit on the dust collecting padding 15. Thus, the function of collecting dust particles on the surface of the document is accomplished.

Figure 3:
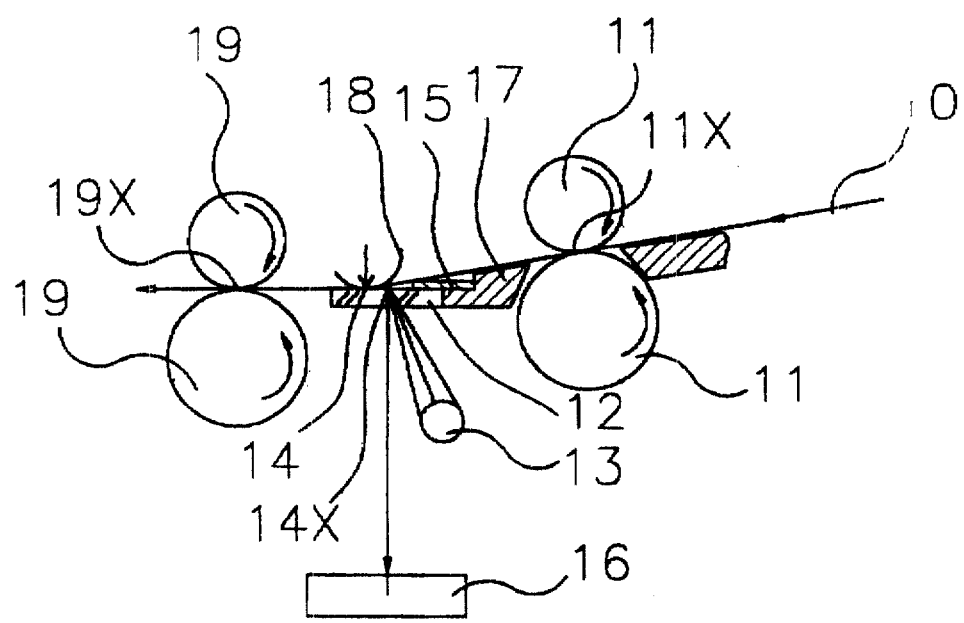
FIG. 3 shows another embodiment of the present invention with a padding placed at the leading edge of the scan window and with the reading light focused above the contact between the document transfer roller and the scan window.

FIG. 3 show another embodiment of the present invention. In addition to placing a dust-collecting padding 15 at the leading edge of the window 12, the focal point the incident light source is moved from the contact point between the transfer roller 11 and the surface of the glass window 12. As shown in FIG. 3, the light beam from source 13 is focused at point 24, which is not at the surface of the glass window 12, but above the surface. The light incident on the surface of the document 10 is at this focal point 24, from which the light is reflected to the sensing system 16. The position of this focal point 24 is designed to be approximately 0.05–1.85 mm above the surface of the glass window 12 and coincide with the surface of the document 10. The thickness of the dust removal padding 15 is approximately 0.1–2.0 mm. The position of the focal point 24 is intermediate between the transfer roller 11 and the dust removal padding 15. If the surface of the glass window 12 has some dust particles, they are not at the focal point 24 of the incident light and these particles cannot block the converging (not yet focused) light as much. Therefore the incident light can better tolerate these dust particles and the quality of the scanning is not degraded as much as the prior art shown in FIG. 1.

Figure 4:
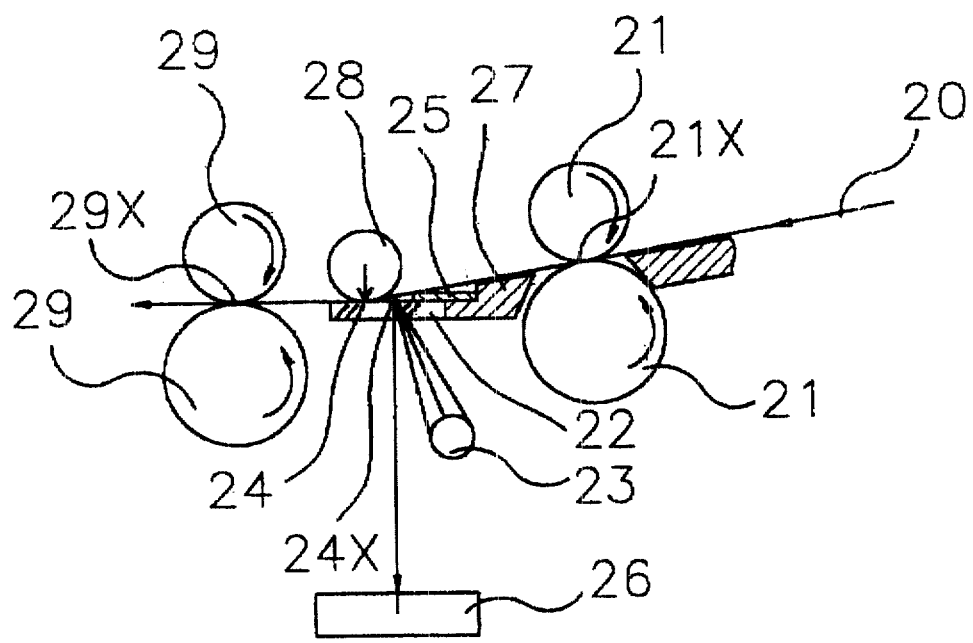
FIG. 4 shows the magnified view of the dust particles piling up at the dust-collecting padding according to this invention.

FIG. 4 shows the distribution of the dust particles in the vicinity of the dust collecting padding 15. The dust particles accumulated on the padding can easily be removed by cleaning, because the dust collecting padding is placed at the leading edge of the glass window, which is easily accessible for cleaning. In addition, the dust-collecting padding 15 can be designed to be removable, thus further facilitating cleaning.

The dust collecting padding can be made of a ribbon of static-free brush. Such static-free material can discharge the static electrical charge stored on the document, thus more effectively collecting the dust particles.

The foregoing description discloses the preferred embodiments as examples of the present invention. The invention is by no means limited to these embodiments. Any equivalent techniques to implement the basic idea and spirit of dust collection in a scanner are all within the scope of this invention.

What is claimed is:

1. A dust-free scanner for document, comprising a transfer roller for transferring the document to be scanned;

a window which is in contact with said transfer roller and over which said document is laid and scanned;

a dust collecting device placed at the leading edge of said window before said document begins to be scanned; and a light source which is focused at the document to be scanned to read the content on the document.

2. A dust-free scanner as described in claim 1, wherein said dust collecting device is a padding.

3. A dust-free scanner as described in claim 2, wherein said dust collecting device is a brush.

4. A dust-free scanner as described in claim 1, wherein said dust collecting device is made of anti-static-electricity material.

5. A dust-free scanner as described in claim 1, wherein said dust collecting device is shaped in the form of a ribbon.

6. A dust-free scanner as described in claim 1, wherein said light source is focused at the contact between the transfer roller and the window.

7. A dust-free scanner as described in claim 1, wherein said light source is focused at a point above said window where the document is not in contact with said window.

8. A dust-free scanner as described in claim 7 wherein said light source is focused at a point intermediate between said dust collecting device and the contact between said transfer roller and said window.

9. A dust-free scanner as described in claim 7, wherein said dust collecting device has a height between 0.1 mm and 2.0 mm.

10. A dust-free scanner as described in claim 7, wherein the point at which the light source is focused is 0.05 mm to 1.85 mm above the window surface.

* * * * *